(12) United States Patent
Oh (10) Patent No.: US 10,994,286 B2
(45) Date of Patent: May 4, 2021

(54) AIRBORNE DUST CLEANER WITH VORTEX VACUUM GENERATOR

(71) Applicant: TORNADO SYSTEMS CO., LTD., Gyeonggi-do (KR)

(72) Inventor: Hee Bum Oh, Gyeonggi-do (KR)

(73) Assignee: TORNADO SYSTEMS CO., LTD., Gyeonggi-Do (KR)

( * ) Notice: Subject to any disclaimer, the term of this patent is extended or adjusted under 35 U.S.C. 154(b) by 355 days.

(21) Appl. No.: 16/029,292

(22) Filed: Jul. 6, 2018

(65) Prior Publication Data

US 2019/0321832 A1 Oct. 24, 2019

(30) Foreign Application Priority Data

Apr. 19, 2018 (KR) .................. 10-2018-0045373

(51) Int. Cl.
| | |
|---|---|
| *B04C 3/06* | (2006.01) |
| *F24F 3/16* | (2021.01) |
| *B04C 9/00* | (2006.01) |
| *B04C 11/00* | (2006.01) |
| *B04C 3/00* | (2006.01) |

(52) U.S. Cl.
CPC .................. *B04C 3/06* (2013.01); *B04C 9/00* (2013.01); *B04C 11/00* (2013.01); *B04C 2003/006* (2013.01); *B04C 2009/004* (2013.01); *B04C 2009/007* (2013.01); *F24F 3/1603* (2013.01)

(58) Field of Classification Search
CPC ... A47L 5/22; A47L 9/106; A47L 5/24; A47L 9/322; B01D 2273/30; B01D 46/12; B01D 46/521; B01D 2279/55; B04C 3/06; B04C 9/00; B04C 11/00; B04C 2003/006; B04C 2009/004; B04C 2009/007; F24F 3/1603; F24F 2110/64; F24F 2013/205; F24F 13/081; F24F 13/20; F24F 2221/46; F24F 11/52
See application file for complete search history.

(56) References Cited

U.S. PATENT DOCUMENTS

| | | | | |
|---|---|---|---|---|
| 5,443,625 A | * | 8/1995 | Schaffhausen | ..... B01D 46/0005 95/113 |
| 2012/0167336 A1 | * | 7/2012 | Tran | ........................ A47L 9/122 15/347 |

FOREIGN PATENT DOCUMENTS

KR  101700302 B1  *  1/2017  ............. F04D 25/08

OTHER PUBLICATIONS

KR101700302B1_ENG (Espacenet machine translation of Kim) (Year: 2017).*

* cited by examiner

*Primary Examiner* — Jonathan Miller
*Assistant Examiner* — Gabriel E Gitman
(74) *Attorney, Agent, or Firm* — The PL Law Group, PLLC (57) ABSTRACT

An airborne dust cleaner includes a case having an inlet at one side thereof, an outlet at another side thereof, and a space therein, a vortex vacuum generator installed at the inlet and generating and extending a low-pressure zone of a donut-like vortex around the inlet to collect fine dust, and a filtering assembly installed at the outlet and filtering the fine dust collected through the vortex vacuum generator.

20 Claims, 7 Drawing Sheets

AIRBORNE DUST CLEANER WITH VORTEX VACUUM GENERATOR

CROSS-REFERENCE TO RELATED APPLICATIONS

This application claims the priority of Korean Patent Application No. 10-2018-0045373 filed on Apr. 19, 2018, in the Korean Intellectual Property Office, the disclosure of which is incorporated herein by reference.

BACKGROUND

1. Technical Field

The present disclosure relates to an airborne dust cleaner, and more particularly, to an airborne dust cleaner with a vortex vacuum generator at the inlet thereof.

2. Description of the Related Art

Indoor air quality is getting worse, and thus various products are being used to improve these environmental problems. Typically, a vacuum cleaner cleans dust off the floor, and an air purifier is used to purify indoor air.

However, the dust suction force of the air purifier is weak unlike the general expectation. Thus, the air purifier focuses on supplying the filtered air to the room through a blowing fan rather than removing dust in the air so that the air purifier has a role of lowering the concentration of indoor dust by dilution.

The dust suction force of the air purifier is weak because of the fundamental limitation of the general fan which functions to pull air and dust into the inside of the device. In order for the airflow to carry dust, the airflow speed caused by the fan must be higher than the gravity (the force to sink) and the inertia (the force to go in its own direction) of dust. However, the airflow speed generated by most fans drops to less than 10% at a distance from the fan by the diameter of the fan. Therefore, the fan cannot pull dust farther than the diameter of the fan at all.

Figure 1:
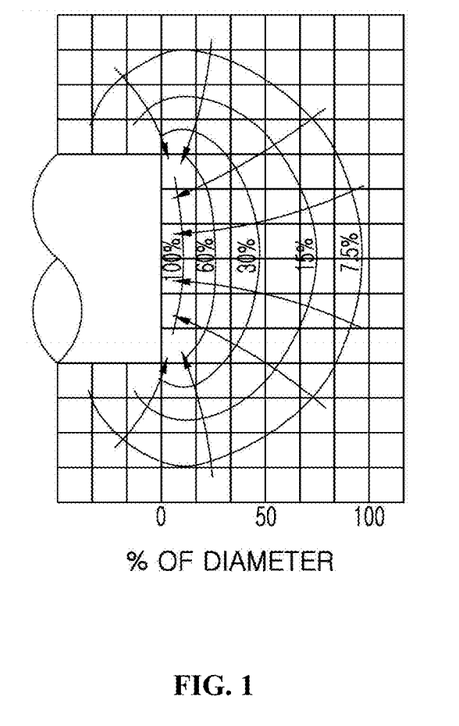
FIG. 1 is a diagram showing a result of simulating the distribution of an inlet flow velocity obtained by a general fan.

FIG. 1 is a diagram showing the distribution of an inlet flow velocity obtained by a general fan. J. M. Dalla Valle used the equation as below to demonstrate that the velocity of the airflow at a position distant from the inlet by the diameter of the inlet is only 7.4% of its original velocity at the inlet (Velocity Contours—plain circular opening—% of opening velocity; American Conference of Governmental Industrial Hygienists (ACGIH): Industrial Ventilation Manual, 23rd Edition).

$$V_x = \frac{V_f}{12.7 \times \left(\frac{x}{d}\right)^2 + 0.75}$$

Wherein $V_x$ is the velocity at the point x, $V_f$ is the velocity at the inlet, x is the separation distance from the inlet, and d is the diameter of the inlet. Therefore, $V_x$ at the point x=d, e.g., at one time of the inlet diameter, refers to $V_x=0.074V_f$. Thus, $V_x$ at the inlet becomes 7.4%.

Further, since all air cleaners have a structure in which various filters (e.g., pre-filter, deodorization filter, and HEPA filter) are placed in front of the fan, the dust suction force by the fan is further lowered due to the differential pressure of the filters. Therefore, heavy particles such as allergen induction substances cannot move to the inlet but fall down.

In order to address such issues, there has been an effort to increase the air volume of the fan installed in the air purifier. However, as the air volume of the fan increases, the power consumption becomes excessively large, and the vibration and noise generated from the fan become substantial. Thus, the reliability of the product has deteriorated.

Further, the conventional air cleaner has an inlet on the front side thereof and an outlet on the upper side thereof. Accordingly, the contaminated air around the air cleaner is not introduced into the inlet. Instead, the air rises toward the ceiling along the airflow discharged from the outlet and then falls back to the ground. This issue becomes more apparent as the air discharge speed of the high-speed rotation of the fan becomes faster.

SUMMARY

An aspect of the present disclosure is to provide an air purifying device by which a fine dust collecting area is more expanded than conventional devices in the art.

Another object of the present disclosure is to provide an air purifying device with low vibration and noise.

Still another aspect of the present disclosure is to provide an air purifying device having a compact size to be easily carried and installed.

In an embodiment of the present disclosure, an airborne dust cleaner may include a case having an inlet at one side thereof, an outlet at another side thereof, and a space therein, a vortex vacuum generator installed at the inlet and generating and extending a low-pressure zone of a donut-like vortex around the inlet to collect fine dust, and a filtering assembly installed at the outlet and filtering the fine dust collected through the vortex vacuum generator.

In another embodiment of the present disclosure, the case may include a base supported on a ground and having a form of a circular plate and a main body supported on the base and having a space therein.

In still another embodiment of the present disclosure, the main body may include a cylindrical body supported on an upper side of the base, a first projection protruding to tilt upward in one direction from an upper end of the cylindrical body, and a second projection protruding to tilt upward in another direction from the upper end of the cylindrical body.

In yet another embodiment of the present disclosure, first and second projections may have hollow types and circular cross-sectional shapes, in which the inlet is disposed at one end of the first projection, and the outlet is disposed at one end of the second projection.

In yet another embodiment of the present disclosure, the vortex vacuum generator may include a swirler fan including a plurality of fins formed vertically on an annular rotation plate having a penetrating portion at a center thereof, an inlet fan disposed at a rear end of the swirl pan, and a drive motor disposed at a rear end of the inlet fan and driving the swirler fan and inlet fan.

In yet another embodiment of the present disclosure, the swirler fan may include an annular band vertically formed along an inner circumferential surface of the rotation plate, a coupling portion disposed at the center of the penetrating portion and coupled with a drive shaft of the drive motor, and a connecting rod extending radially from the coupling portion to the inner circumferential surface of the annular band.

In yet another embodiment of the present disclosure, the vortex vacuum generator may further include a bell mouth surrounding the swirler fan and including a sidewall inclined forward and outward along an edge of a rear end thereof and a guide flange extending outward from a front end of the sidewall and formed to be the same as or further forward than the position of the front end of the swirler fan.

In yet another embodiment of the present disclosure, the vortex vacuum generator may further include an inlet fan housing receiving the inlet fan and including a flow path guiding rearward air discharged from the inlet fan.

In yet another embodiment of the present disclosure, the inlet fan housing may include a housing body having a cylindrical shape and including an opened rear end and an opening at a center of a front end thereof so as to be penetrated through the housing body and a bottom plate coupled to the rear end of the housing body and having a circular plate shape.

In yet another embodiment of the present disclosure, the inlet fan housing may further include a pair of guides facing each other and protruding spirally from one side and another side of the housing body, respectively, so as to decrease in width and height thereof along the circumferential direction of the housing body.

In yet another embodiment of the present disclosure, the flow path is sectionalized by a partition wall inside each of the pair of guides, in which a cross-section area of the flow path gradually decreases along the circumferential direction of the guide, and an entrance of the flow path is connected to a space inside the housing body.

In yet another embodiment of the present disclosure, the bottom plate may be provided with a pair of guide slots corresponding to the pair of guides, respectively, and penetrating through the bottom plate.

In yet another embodiment of the present disclosure, the housing body may include a support protruding along the periphery of the opening and a plurality of coupling bosses protruding from an outer periphery of the support.

In yet another embodiment of the present disclosure, a light-emitting diode (LED) substrate having an LED mounted thereon may be coupled between the support and the coupling bosses.

In yet another embodiment of the present disclosure, a color of light emitted by the LED may vary according to a value measured by a fine dust sensor provided inside the case.

In yet another embodiment of the present disclosure, the filtering assembly may include a filter housing coupled inside the outlet and a filter housed in the filter housing.

In yet another embodiment of the present disclosure, the cleaner may further include a guide tube installed inside the case and having one end connected to a rear end of the vortex vacuum generator and the other end connected to a front end of the filtering assembly.

In yet another embodiment of the present disclosure, the cleaner may further include a front grill coupled to the inlet and disposed in front of the vortex vacuum generator and a pre-filter coupled to one side of the front grill.

In yet another embodiment of the present disclosure, the cleaner may further include a fine dust sensor provided at one side of the space and a light-emitting diode (LED) provided at one side of the inlet in which a color of light emitted by the LED varies according to a value measured by the fine dust sensor provided inside the case.

In yet another embodiment of the present disclosure, the cleaner may further include a universal serial bus (USB) charging terminal provided at one side of the case.

According to an embodiment of the present disclosure, the airborne dust cleaner generates a low-pressure zone of a donut-like vortex to expand the fine dust collecting area.

Further, according to an embodiment of the present disclosure, the airborne dust cleaner can remove fine dust in the room with low power and low noise.

Further, according to an embodiment of the present disclosure, the airborne dust cleaner is lightweight so as to be readily carried and installed and is compact in size to be placed on a desk or table and to be conveniently used.

Further, according to an embodiment of the present disclosure, the airborne dust cleaner has LEDs whose light's color varies according to the concentration of fine dust so that the quality of indoor air can be monitored in real time.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Hereinafter, examples of the present disclosure will be described in detail with reference to the accompanying drawings. It should be understood, however, that the examples as described below are merely illustrative of the present disclosure so that those skilled in the art will be able to easily carry out the present disclosure. Therefore, the examples do not limit the scope of the present disclosure. In describing various examples of the present disclosure, the same reference numerals are used for components having the same or similar technical characteristics.

Examples

Figure 2:
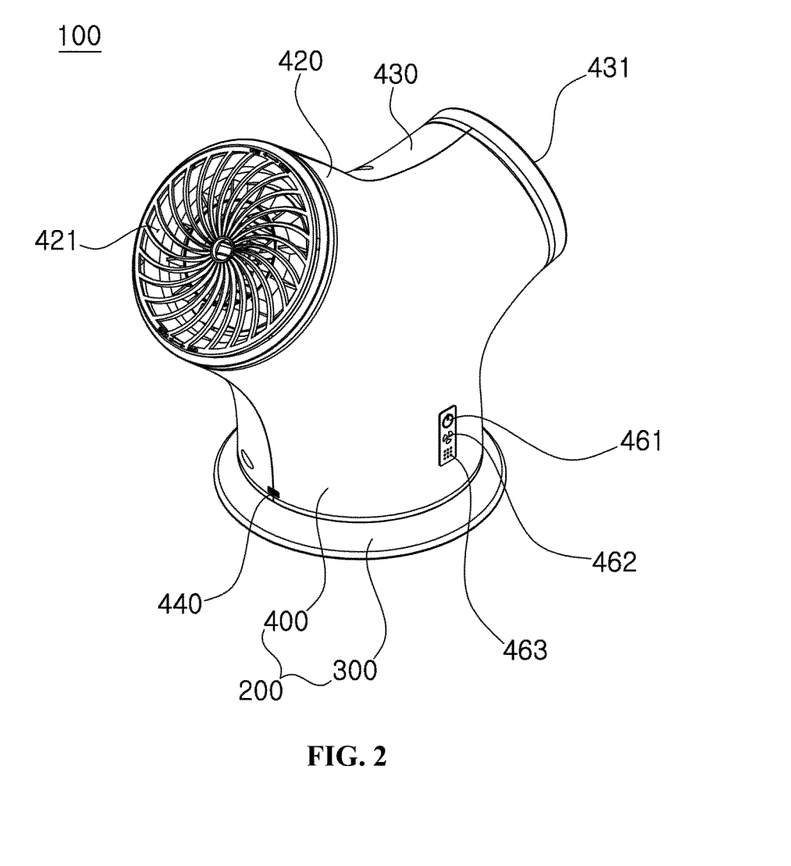
FIG. 2 is a perspective view of an airborne dust cleaner according to one embodiment of the present disclosure.

FIG. 2 is a perspective view of an airborne dust cleaner according to one embodiment of the present disclosure. Further, FIGS. 3 and 4 are side views of an airborne dust cleaner according to one embodiment of the present disclosure.

Figure 3:
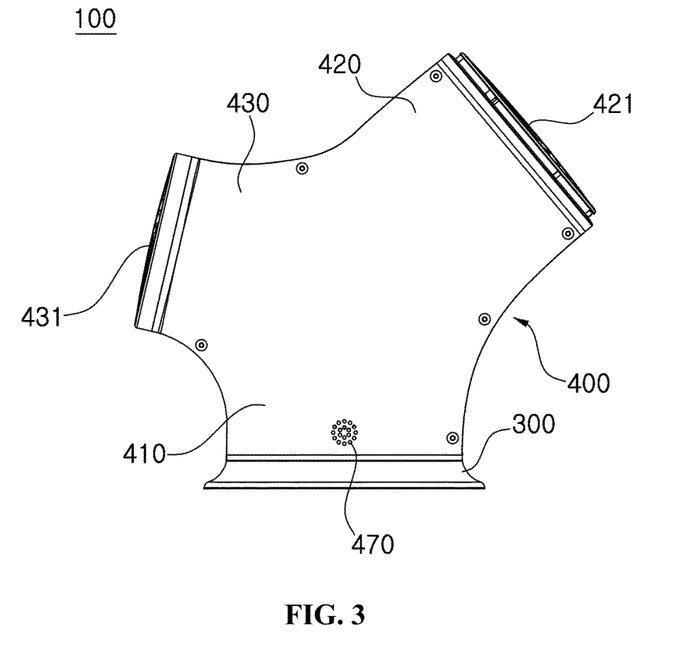
FIG. 3 is a left side view of an airborne dust cleaner according to one embodiment of the present disclosure.
Figure 4:
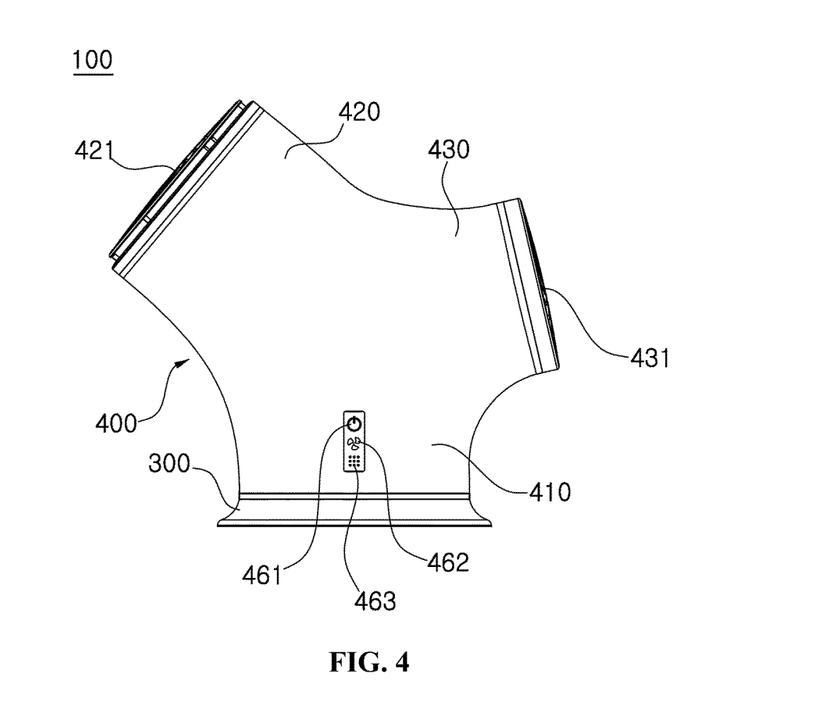
FIG. 4 is a right side view of an airborne dust cleaner according to one embodiment of the present disclosure.

As shown in FIGS. 2 to 4, an airborne dust cleaner 100 with a vortex vacuum generator at the inlet thereof according to an embodiment of the present disclosure (hereinafter, referred as to "airborne dust cleaner") may include a case 200 having an inlet 421 and an outlet 431, a vortex vacuum generator 500 installed at the inlet 421, and a filtering assembly 700 installed at the outlet.

The case 200 may include a base 300 supported on a ground and having a form of a circular plate and a main body 400 supported on the base 300 and having a space therein. The width of the base 300 may be larger than the width of the lower end of the main body 400 so as to support the main body 400 stably.

The main body 400 may include a cylindrical body 410 supported on the upper side of the base 300, a first projection 420 protruding to tilt upward in one direction from an upper end of the cylindrical body 410, and a second projection 430 protruding to tilt upward in another direction from the upper end of the cylindrical body 410.

A USB charging terminal 440 may be provided in the lower end of the front side of the main body 410, and a connector terminal 450 for connecting a power cable may be provided in the lower portion of the rear side thereof.

A power button 461, a selection button for drive mode 462, and an LED operation button 463, which operate in a touch manner, may be provided in the lower portion of one side of the main body 410 for the operation control of the airborne dust cleaner 100. For example, users can touch the power button 461 to turn on/off the airborne dust cleaner 100. Further, users can touch the selection button for drive mode 462 to select the automatic mode or one of the three operation modes which are classified by the rotation speed of the fan. On the selection of the automatic mode, the ON/OFF of power and rotation speed of the fan may be automatically adjusted according to the indoor air quality. Further, in one aspect of the present disclosure, the emission color of an LED 581 installed on the inlet 421 may vary according to the indoor air quality. If necessary, users can touch the LED operation button 463 to turn ON/OFF the LED 581. Further, the LED operation button 463 may serve as a warning lamp for notifying the filter replacement timing by, for example, red light emission.

A plurality of through-holes 470 may penetrate to be formed in a lower portion of another side of the main body 410. Further, a fine dust sensor 910 for sensing fine dust may be provided in a space inside the main body 410 where the through-holes 470 are located. The emission colors of the LED 581 installed on the inlet 421, and the rotation speed of the fan on the automatic mode may vary according to values measured by the fine dust sensor 910.

The first projection 420 and the second projection 430 may have a hollow type and a circular cross-sectional shape. Outer surfaces of the main body 410 and the first projection 420 may be connected with each other to form a smooth curved surface. Further, outer surfaces of the main body 410 and the second projection 430 may be connected with each other to form a smooth curved surface. Further, outer surfaces of the first and second projections 420 and 430 may be connected with each other to form a smooth curved surface. The inlet 421 may be provided in one end of the first projection 420 to allow fine dust to pass into the inlet 421. The outlet 431 may be provided at one end of the second projection 430 to discharge the air filtered by the filtering assembly 700.

Figure 5:
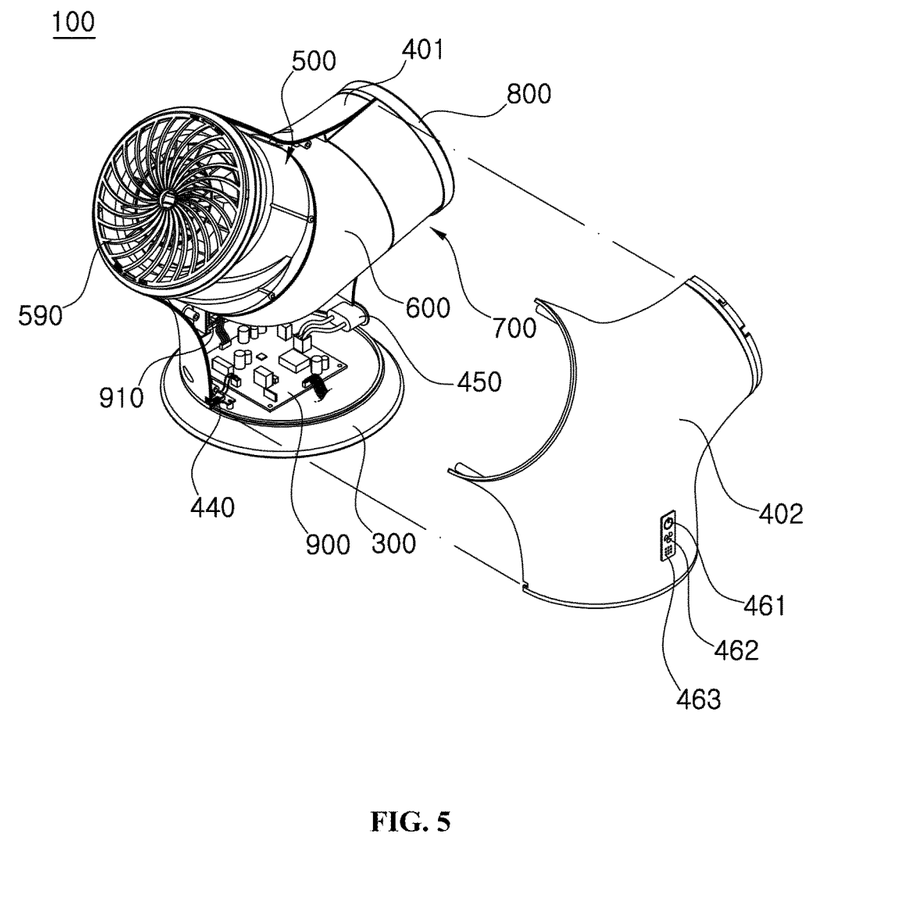
FIG. 5 is a partial exploded view of an airborne dust cleaner according to one embodiment of the present disclosure.

FIG. 5 is a partial exploded view of an airborne dust cleaner according to one embodiment of the present disclosure.

As shown in FIG. 5, the main body 400 may be formed by combining the first main body 401 and the second main body 402 which have bilateral symmetry. The first main body 401 and the second main body 402 may be coupled to each other by fasteners such as bolts.

Further, in one aspect of the present disclosure, the airborne dust cleaner 100 may include a vortex vacuum generator 500 installed at the inlet 421 and a filtering assembly 700 installed at the outlet 431. More specifically, the vortex vacuum generator 500 may be installed adjacent to the inlet 421 inside the first projection 420, and the filtering assembly 700 may be installed adjacent to the outlet 431 inside the second projection 430.

The vortex vacuum generator 500 may include an inlet fan 530 that sucks ambient air while rotating by a drive motor 540. Accordingly, the indoor fine dust may be introduced into the space inside the main body 400 through the inlet 421 and pass through the filtering assembly 700, and then the outlet 431 supplies the filtered air indoors.

Hereinafter, the configurations of the vortex vacuum generator 500 and the filtering assembly 700 are described in detail with reference to FIGS. 6 and 7.

Figure 6:
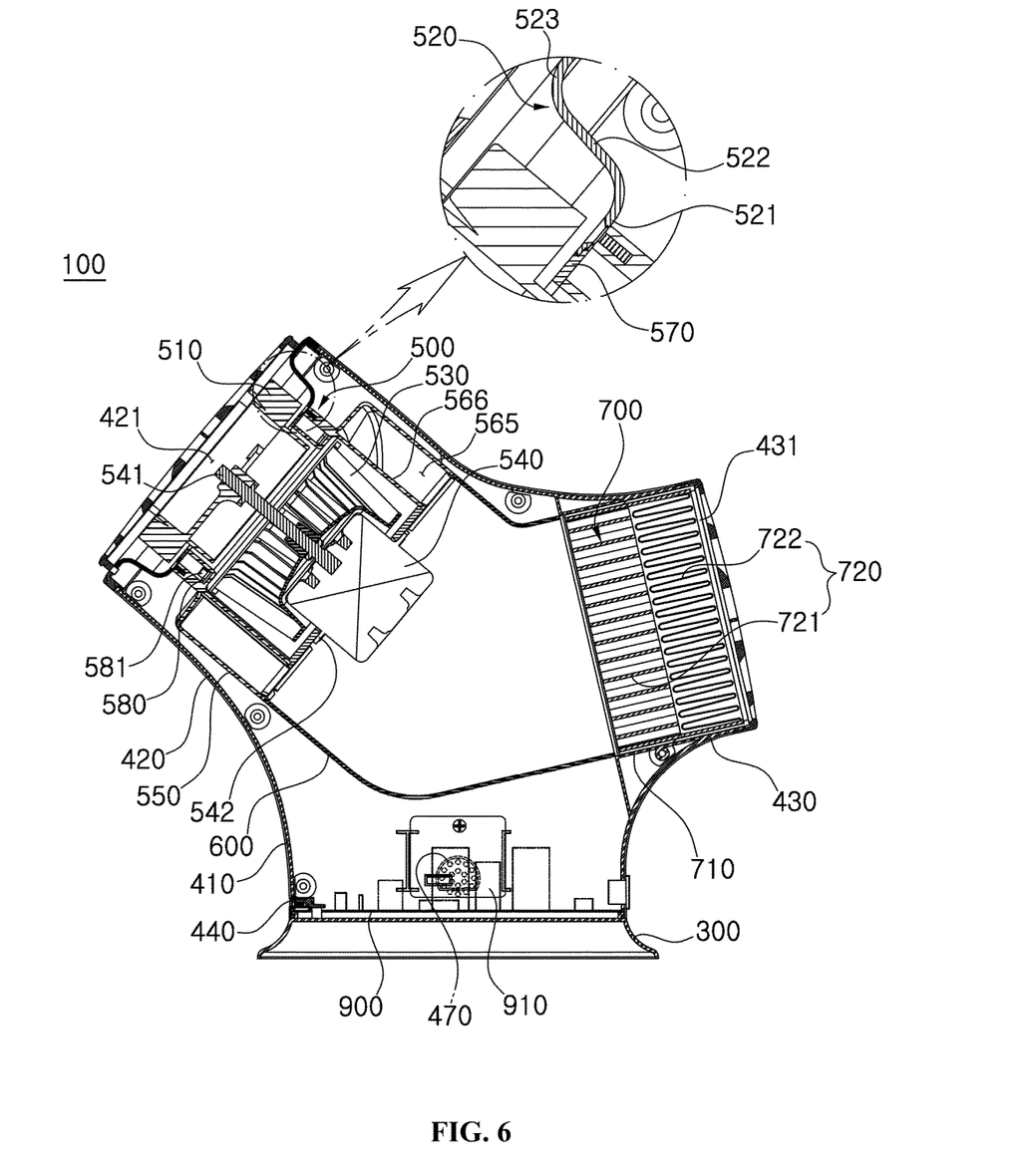
FIG. 6 is a cross-sectional view of an airborne dust cleaner according to one embodiment of the present disclosure.
Figure 7:
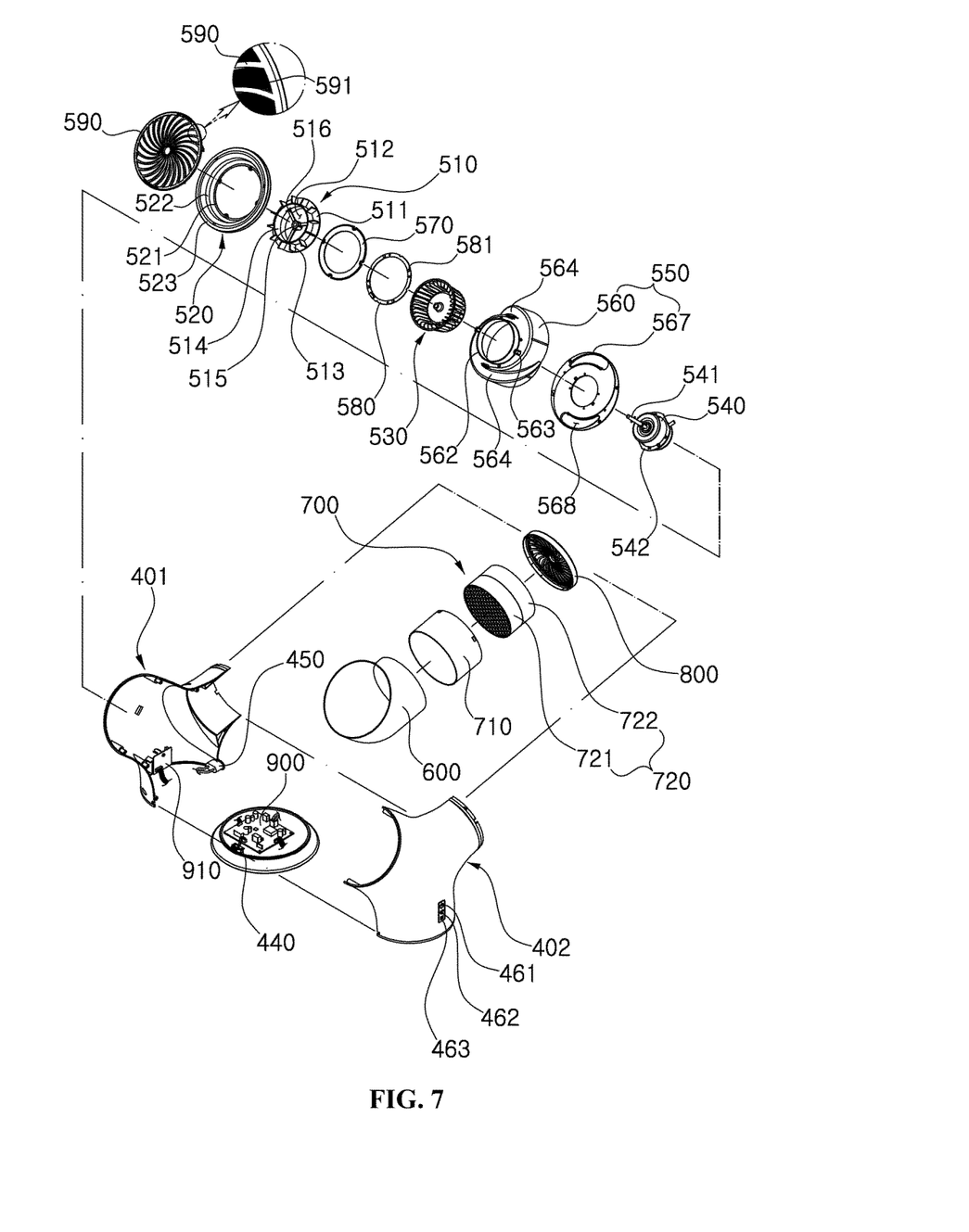
FIG. 7 is an exploded perspective view of an airborne dust cleaner according to one embodiment of the present disclosure.

FIG. 6 is a cross-sectional view of an airborne dust cleaner according to one embodiment of the present disclosure, and FIG. 7 is an exploded perspective view of an airborne dust cleaner according to one embodiment of the present disclosure.

As shown in FIGS. 6 and 7, the vortex vacuum generator 500 may include a swirler fan 510, an inlet fan 530 disposed at the rear end of the swirl pan 510, and a drive motor 540 disposed at the rear end of the inlet fan 530 and driving the swirler fan 510 and the inlet fan 530.

The swirler fan 510 may include an annular rotation plate 511 having a penetrating portion 512 at the center thereof, a plurality of fins 513 formed vertically on the rotation plate, an annular band 514 vertically formed along an inner circumferential surface of the rotation plate 511, a coupling portion 515 disposed at the center of the penetrating portion 512 and coupled with a drive shaft 541 of the drive motor 540, and a connecting rod 516 extending radially from the coupling portion to the inner circumferential surface of the annular band 514.

A bell mouth 520 may be installed to surround the swirler fan 510. The bell mouth 520 may have a tapered cylindrical shape in which the diameter of the front end portion thereof may be generally larger than that of the rear end portion thereof. A coupling flange 521 may protrude to have a predetermined width toward the inside along an edge of the rear end of the bell mouth 520, and a sidewall 522 may extend to have a curved shape which is inclined outward and toward the front thereof.

The bell mouth 520 may be installed so that the sidewall 522 surrounds the outside of the fins 513 of the swirler fan 510. In other words, when the swirler fan 510 is mounted in the bell mouth 520, a guide flange 523 may be formed to be the same as or further forward than the position of the front ends of the fins 513 along the central axial direction of the swirler fan 510. This is to cause the airflow pushed outward, during the rotation of the swirler fan 510, to flow along the sidewall 522 of the bell mouth 520 by the Coanda effect. Thus, the airflow flowing along the sidewall 522 is guided to the outside along the guide flange 523, thereby forming a vortex.

In other words, the rotation of the swirler fan 510 may cause airflow to flow toward the outer side of the swirler fan 510 and then to come back, thereby forming a kind of donut-like low-pressure zone which is formed at the outer periphery of the swirler fan 510. This low-pressure zone may lead to low pressure at the center of the donut-like vortex, so that inlet airflow occurs toward the center of the swirler fan 510. However, the desired effect of inletting fine dust may not be acquired only by the inlet airflow due to the rotation of the swirler fan 510. Thus, the inlet fan 530 may further be disposed and operated at the rear end of the swirler fan 510, thereby generating strong inlet airflow.

The inlet fan 530 may be a centrifugal fan such as a sirocco fan or an axial fan such as a propeller fan. The inlet fan 530 may rotate together with the swirler fan 510 to result in a circular motion of the donut-like low-pressure zone. Thus, the resulting whirlwind airflow may collect a significant amount of fine dust. The central portion of the whirlwind flow may be a very low low-pressure zone. The airflow sucked by the inlet fan 530 may pass through the center of the swirler fan 510 at high speed and be introduced into the case 200.

The drive motor 540 may be installed behind the inlet fan 530, and the drive shaft 541 of the drive motor 540 may pass through the inlet fan 530 to extend to the swirler fan 510. In other words, the inlet fan 530 and the swirler fan 510 may be simultaneously rotated by the drive motor 540.

The inlet fan 530 may be received inside the inlet fan housing 550 while being rotated. Further, the inlet fan housing 550 may be inserted and mounted inside the first projection 420. The inlet fan housing 550 may include a housing body 560 including an opened rear end and a bottom plate 567 coupled to the rear end of the housing body 560 and having a circular plate shape. Further, the drive motor 540 may be coupled to a back side of the bottom plate 567 using a motor bracket 542.

The housing body 560 may be overall cylindrical. An opening 561 may penetrate to be formed at the center of the front end of the housing body 560. A support 562 may protrude forward along the periphery of the opening 561. When the swirler fan 510 is coupled to the front of the housing body 560, the rear end of the annular band 514 of the swirler fan 510 may be accommodated inside the support 562.

A pair of guides 564 may protrude spirally from one side and another side of the sidewall of the housing body 560, respectively, facing toward each other. Further, widths and heights of the pair of guides 564 gradually decrease along the circumferential direction. Further, a pair of guide holes 568 may be formed through the bottom plate 567 so as to correspond to the pair of guides 564.

Figure 8:
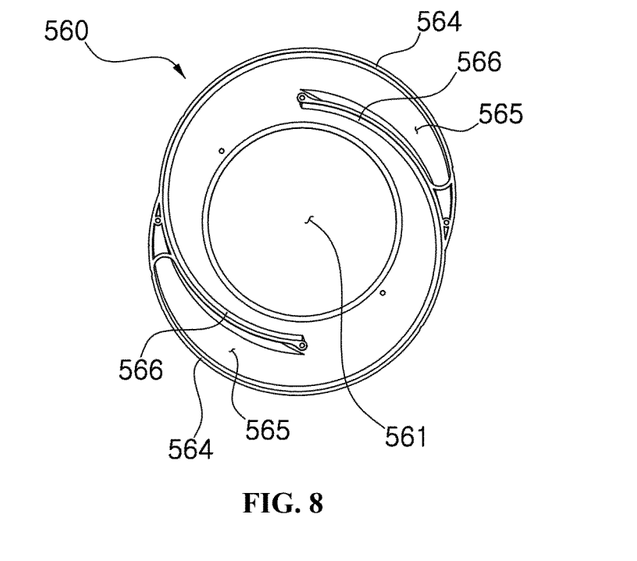
FIG. 8 is a rear view of a housing body according to one embodiment of the present disclosure.

FIG. 8 is a rear view of a housing body according to one embodiment of the present disclosure. As shown in FIG. 8, a flow path 565 may be sectionalized by a partition wall 566 inside each of the pair of guides 564. A cross-section area of the flow path gradually decreases along the circumferential direction of each of the pair of guides 564. Further, an entrance of the flow path 565 may be connected to a space inside the housing body. When the bottom plate 567 is connected therewith, an entrance of the flow path 565 may be one of the pair of guide holes 568 which penetrates through the bottom plate 567.

Assuming that the inlet fan 530 is a centrifugal fan such as a sirocco fan, the reason why the pair of guides 564 and the pair of guide holes 568 are formed in the inlet fan housing 550 may be to guide the airflow, which is discharged to outward side of the radial direction of the inlet fan 530, to the rear of the inlet fan housing 550.

The flow path 565 inside each of the pair of guides 564 may be formed in such a shape that the cross-section area gradually decreases along the circumferential direction thereof. Thus, the airflow passing through the flow path 565 may flow through each of the pair of guide holes 568 to be discharged quickly to the rear of the inlet fan housing 550. This results in prevention of a decrease in the suction force caused by the accumulation of the airflow discharged from the inlet fan 530.

Referring again to FIGS. 6 and 7, the rear end of the bell mouth 520 may be coupled to the front end of the inlet fan housing 550. In detail, a plurality of coupling bosses 563 may protrude along the outer circumference of the support 562 of the housing body 560.

A fastener such as a bolt may penetrate through the coupling flange 521 of the bell mouth 520 and the plurality of coupling bosses 563 of the housing body 560, resulting in coupling the bell mouth and the housing body 560. Further, a ring-shaped gasket 570 may be coupled to the front side of the coupling flange 521 to prevent leakage of the airflow discharged from the swirler fan 510.

An LED substrate 580 may be coupled between the support 562 and the plurality of coupling bosses 563 along the circumference of the support 562 of the housing body 560. The LED substrate 580 may be circular. As another example, a plurality of LED substrates 580 having an arc-shape may be coupled along the circumference of the support 562. An LED 581 may be mounted on the LED substrate 580. Further, the color of light emitted by the LED 851 may vary according to the value measured by the fine dust sensor 910. Thus, users may monitor emission color projected from the LED 581 and leaking toward the inlet 421 so that they can recognize indoor air quality.

A front grill 590 may be detached and may be coupled to the front end of the bell mouth 520. A grid mesh 591 having a plurality of fine holes may be coupled to one side of the front grill 590 by a method such as adhesion or fusion. The front grill 590 may be installed in front of the vortex vacuum generator 500 first to remove foreign substances such as dust when the fine dust is sucked, which functions as a pre-filter.

The air sucked into the main body 400 by the vortex vacuum generator 500 may be discharged to the rear of the inlet fan housing 550 to pass through the filtering assembly 700 installed inside the second projection 430. Then, the filtered air may pass through the outlet 431 to come back indoors.

In this embodiment, a guide tube 600 may be coupled with vortex vacuum generator 500 and the filtering assembly 700, which is installed between the first projection 420 and the second projection 430 so as to guide the airflow discharged to the rear of the inlet fan housing 550 toward the second projection 430.

For example, the guide tube 600 may have open front and rear ends and have a bent pipe-shape in which both ends thereof are bent at a predetermined angle. The front end of the guide tube 600 may be coupled to the rear side of the bottom plate 567 of the inlet fan housing 550. The rear end of the guide tube 600 may be bent at a predetermined angle and extended in the direction of the second projection 430. Further, the rear end of the guide tube 600 may be disposed to be brought into close contact with the front end of the filter housing 710 as described below. In this embodiment, the airflow may be introduced into the guide tube 600 through the guide hole 568 of the bottom plate 567 to flow along the guide tube 600 in the direction of the filtering assembly 700.

The filtering assembly 700 may include the filter housing 710 and at least one filter 720 mounted in the filter housing 710 to play a role in filtering the dust collected by the vortex vacuum generator 500.

The filter housing 710 may have a cylindrical shape with open front and rear ends and may be inserted and coupled to the second projection 430. In this embodiment, the front end of the filter housing 710 may be disposed to bring into close contact with the rear end of the guide tube 600 to prevent leakage of the airflow as described above. A filter 720 functions to filter fine particles such as fine dust, tobacco smoke, pollen, animal keratin, house dust mite, mold, bacteria, and viruses. For example, an activated carbon filter 721 and a high-efficiency particulate air (HEPA) filter 722 may be sequentially stacked and received in the filter housing 710.

A rear grill 800 may be disposed at the rear end of the filtering assembly 700, which may be coupled to the rear end of the second projection 430.

A controller 900 having a PCB substrate-type may be installed on the upper side of the base 300. The controller 900 may play a role in controlling the power ON/OFF, the rotation speed of the drive motor 540, the LED ON/OFF, the LED emission light, the warning light, the communication with the fine dust sensor 910, and the like.

Hereinafter, the operation of the airborne dust cleaner 100 according to an embodiment of the present disclosure is described in detail with reference to FIGS. 2 to 8.

First, users may touch the power button 461 to supply power to the airborne dust cleaner 100 and touch the selection button for drive mode 462 to select the operation mode.

The power supply may allow the drive motor 540 to operate, and thus the swirler fan 510 and the inlet fan 530 simultaneously rotate. In this embodiment, the rotation speed of the drive shaft 541 of the drive motor 540 is adjusted according to the selected operation mode. The emission color of light emitted by the LED 581 disposed around the inlet 421 may be changed according to the value measured by the fine dust sensor 910. For example, the LED 581 can emit light in four steps of blue-green-orange-red according to indoor air quality.

The rotation of the swirler fan 510 may cause the airflow to be pushed outward which flows along the guide flange 523 and the sidewall 522 of the bell mouth 520 by the Coanda effect and is strongly jetted outward the bell mouth 520. Thus, the vortex of donut-like low-pressure zone may occur at the periphery of the inlet 421.

In this embodiment, low pressure is also formed in the center of the donut-like vortex so that the inlet airflow occurs toward the center of the swirler fan 510. The inlet fan 530, which rotates simultaneously with the swirler fan 510, may act to deliver the driving force to the inlet airflow to strengthen it. In other words, the rotation of the swirler fan 510 and the inlet fan 530 may lead to a powerful inlet airflow which is sucked into the inlet fan 530 through the swirler fan 510, and fine dust around the inlet fan 530 may be loaded in the inlet airflow so that the fine dust is sucked into the inlet fan 530 rapidly together with the inlet airflow. Further, the vortex of the donut-like low-pressure zone may extend to the periphery of the inlet 421 to result in the broader area to collect and inlet dust than conventional airborne dust cleaners.

The airflow sucked through the swirler fan 510 may be discharged to the outward side of the radial direction of the inlet fan 530. Then the airflow may flow along the flow path 565 of the guide 564 of the inlet fan housing 550 and be discharged into the guide tube 600 through the guide hole 568. Thereafter, the airflow moving along the guide tube 600 may pass through the filter 720 so that fine dust is removed, and cleanly filtered air may be supplied indoor through the outlet 431 again.

Figure 9:
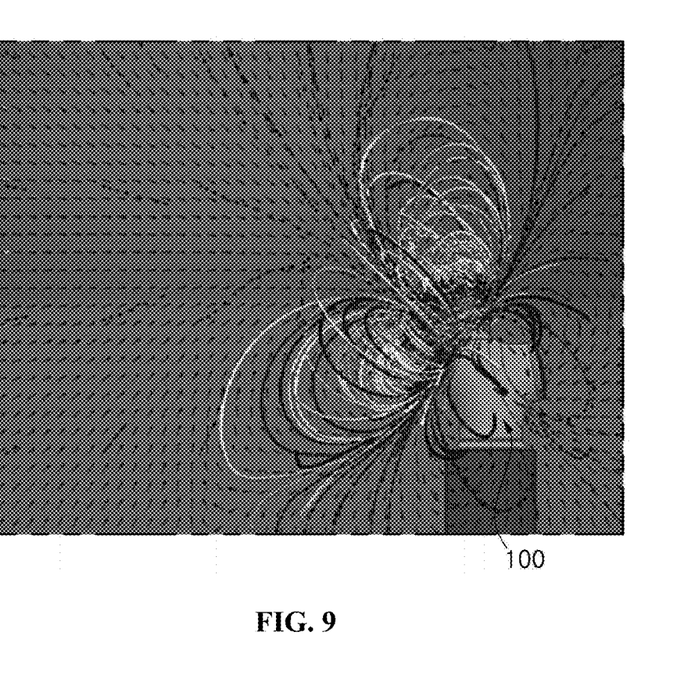
FIG. 9 is a diagram showing a result of simulating ambient air flow during operation of an airborne dust cleaner according to one embodiment of the present disclosure.

FIG. 9 is a diagram showing a result of simulating ambient airflow during operation of an airborne dust cleaner according to one embodiment of the present disclosure. As shown in FIG. 9, the swirler fan 510 may form a donut-like vortex at the periphery of the inlet 421. Thus, the dust collecting area may be expanded compared with conventional ones. The center of the donut-like vortex may be a low-pressure zone in which surrounding air is sucked in with fine dust. The inlet fan 530 may enhance the fine dust inlet force.

As described above, the present disclosure has been described in connection with the examples thereof. However, it will be understood by those skilled in the art that various modifications may be made without departing from the scope of the present disclosure.

Although the examples of the present disclosure have been described in detail with reference to the accompanying drawings, the present disclosure is not limited thereto and may be embodied in many different forms without departing from the technical concept of the present disclosure. Therefore, the examples of the present disclosure are provided for illustrative purposes only but not intended to limit the technical concept of the present disclosure. The scope of the technical concept of the present disclosure is not limited thereto. Therefore, it should be understood that the examples are illustrative in all aspects and do not limit the present invention. The protective scope of the present disclosure should be construed based on the following claims, and all the technical concepts in the equivalent scope thereof should be construed as falling within the scope of the present disclosure.

What is claimed is:

1. An airborne dust cleaner comprising:
    a case having an inlet at one side thereof and an outlet at another side thereof;
    a vortex vacuum generator installed at the inlet for generating a donut-like vortex around the inlet but not around the outlet to collect fine dust; and
    a filtering assembly installed at the outlet for filtering the fine dust collected through the vortex vacuum generator.

2. The airborne dust cleaner of claim 1, wherein the case comprises:
    a base supported on a ground and having a form of a circular plate; and
    a main body supported on the base and having a space therein.

3. The airborne dust cleaner of claim 2, wherein the main body comprises:
    a tubular body supported on an upper side of the base;
    a first projection protruding to tilt upward in one direction from an upper end of the tubular body; and
    a second projection protruding to tilt upward in another direction from the other end of the tubular body.

4. The airborne dust cleaner of claim 3, wherein the first and second projections are hollow and have circular cross-sectional shapes,
    wherein the inlet is disposed at one end of the first projection; and
    the outlet is disposed at one end of the second projection.

5. The airborne dust cleaner of claim 1, wherein the vortex vacuum generator comprises:
    a swirler fan including a plurality of fins formed on an annular rotation plate having a penetrating portion at a center thereof;
    an inlet fan disposed at a rear end of the swirler fan; and
    a drive motor disposed at a rear end of the inlet fan and driving the swirler fan and the inlet fan.

6. The airborne dust cleaner of claim 5, wherein the swirler fan comprises:
- an annular band formed along an inner circumferential surface of the rotation plate;
- a coupling portion disposed at the center of the penetrating portion and coupled with a drive shaft of the drive motor; and
- a connecting rod extending radially from the coupling portion to the inner circumferential surface of the annular band.

7. The airborne dust cleaner of claim 5, wherein the vortex vacuum generator further comprises a bell mouth surrounding the swirler fan, and the bell mouth includes:
- a sidewall inclined forward and outward along an edge of a rear end thereof; and
- a guide flange extending outward from a front end of the sidewall and formed to extend into alignment with the front end of the swirler fan or to be at a farther forward position in relation to the front end of the swirler fan.

8. The airborne dust cleaner of claim 5, wherein the vortex vacuum generator further comprises an inlet fan housing receiving the inlet fan and including a flow path for guiding air discharged from the inlet fan.

9. The airborne dust cleaner of claim 8, wherein the inlet fan housing comprises:
- a housing body having a cylindrical shape and including an opened rear end and an opening at a center of a front end thereof so as to be penetrated through the housing body; and
- a bottom plate coupled to the rear end of the housing body and having a circular plate shape.

10. The airborne dust cleaner of claim 9, wherein the inlet fan housing further comprises:
- a pair of guides facing each other and protruding spirally from one side and another side of the housing body, respectively, so as to decrease the width and the height of the flow path through the housing body.

11. The airborne dust cleaner of claim 10, wherein the flow path is sectionalized by a partition wall inside each of the pair of guides,
- wherein a cross-sectional area of the flow path gradually decreases along a length of the flow path; and
- an entrance of the flow path is connected to a space inside the housing body.

12. The airborne dust cleaner of claim 10, wherein the bottom plate is provided with a pair of guide slots corresponding to the pair of guides, respectively, and penetrating through the bottom plate.

13. The airborne dust cleaner of claim 9, wherein the housing body comprises:
- a support protruding along a periphery of the opening; and
- a plurality of coupling bosses protruding from an outer periphery of the support.

14. The airborne dust cleaner of claim 13, wherein a light-emitting diode (LED) substrate having an LED mounted thereon is coupled between the support and the coupling bosses.

15. The airborne dust cleaner of claim 14, wherein a color of light emitted by the LED varies according to a value measured by a fine dust sensor provided inside the case.

16. The airborne dust cleaner of claim 1, wherein the filtering assembly comprises:
- a filter housing coupled inside the outlet; and
- a filter housed in the filter housing.

17. The airborne dust cleaner of claim 1, further comprising a guide tube installed inside the case and having one end connected to a rear end of the vortex vacuum generator and the other end connected to a front end of the filtering assembly.

18. The airborne dust cleaner of claim 1, further comprising:
- a front grill coupled to the inlet and installed in front of the vortex vacuum generator; and
- a pre-filter coupled to one side of the front grill.

19. The airborne dust cleaner of claim 1, further comprising:
- a fine dust sensor provided at the inlet side of the case; and
- a light-emitting diode (LED) provided at one side of the inlet in which a color of light emitted by the LED varies according to a value measured by the fine dust sensor provided inside the case.

20. The airborne dust cleaner of claim 1, further comprising a USB charging terminal provided at one side of the case.

* * * * *